May 30, 1939.  E. I. WIGGINS  2,160,047
RADIO ANTENNA FOR AUTOMOBILES
Filed Oct. 29, 1936
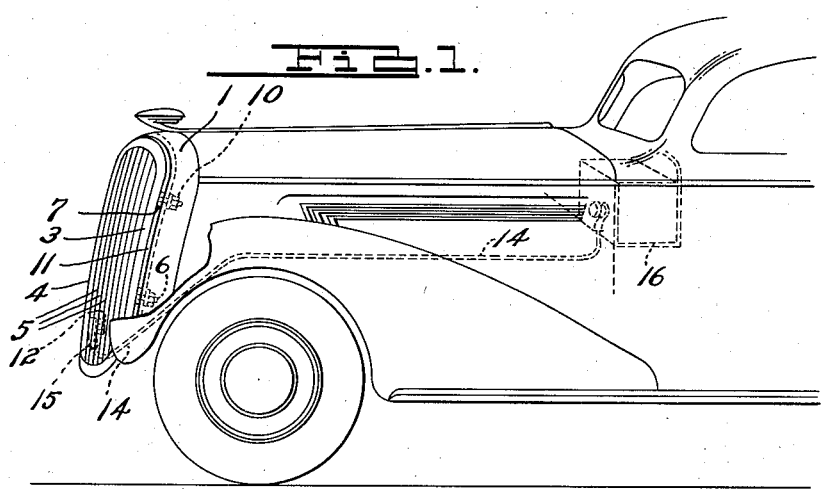
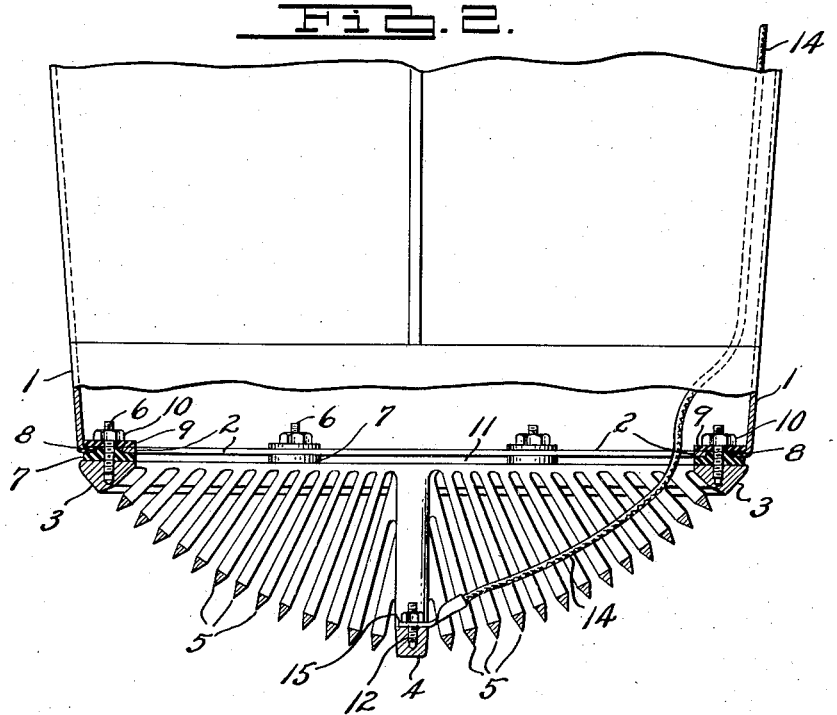
INVENTOR.
Eugene I. Wiggins
BY
Emmett B. Wisner
ATTORNEY.

Patented May 30, 1939

2,160,047

UNITED STATES PATENT OFFICE 2,160,047

RADIO ANTENNA FOR AUTOMOBILES

Eugene I. Wiggins, Flint, Mich.

Application October 29, 1936, Serial No. 108,177

1 Claim. (Cl. 250—33)

This invention relates to radio antenna for automobiles and the object of the invention is to provide an antenna in the form of a radiator grille secured to and mounted in spaced relation with the automobile radiator shell and electrically insulated therefrom to provide an antenna for the automobile radio.

Another object of the invention is to provide an antenna of the character described comprising an electrically insulated grille having a rim member and a series of grille bars extending across from one side of the rim member to the other and electrically connected thereto so that the entire grille may be utilized as an antenna and provided with a shielded lead in wire connected thereto and to the automobile radio set.

A further object of the invention is to provide a grille secured to the radiator shell through insulators whereby the grille is insulated from the radiator shell and other parts of the automobile to provide an antenna for the automobile radio.

Another object of the invention is to provide a radio antenna for an automobile comprising a grille mounted on the forward end of the automobile in a position where it is not shielded by any of the parts of the automobile and is non-directional.

These objects and the several novel features of the invention are hereinafter more fully described and claimed and the preferred form of construction by which these objects are attained is shown in the accompanying drawing in which—

Fig. 1 is a side elevation of the forward end of an automobile equipped with my improved radio antenna.

Fig. 2 is an enlarged section through the radiator grille above the lead in connection.

As shown in Figs. 1 and 2 the radiator shell 1 is provided with an inturned peripheral flange 2 about the forward edge thereof. The grille comprises a rim portion 3 extending about the edge of the grille and provided with a central heavy rib 4 and a series of smaller spaced ribs 5 formed integrally with the rim as a single unit. This grille may be a die casting of electrically conductive metal or may be a stamping, if so desired. In the form shown in Figs. 1 and 2 the rim 3 is provided with a series of threaded studs 6 embedded therein and an insulating washer 7 is positioned over each stud 6 and is provided with a portion 8 of smaller diameter extending through apertures provided therefor in the inturned flange 2 of the radiator shell 1. An insulating washer 9 is then slipped over each stud and the nuts 10 are turned up to secure the grille to the radiator shell. This insulates the grille completely from the shell and also provides a space 11 equal to the thickness of the washer portions 7 so that the grille is spaced from the radiator shell about its entire periphery.

The enlarged central rib 4 of the grille is provided with a stud 12 and a shielded lead in wire 14 is connected to the stud 12 by the nut 15. This shielded lead in wire 14 leads to the aerial connection of the radio receiving set 16 shown in dotted lines in Fig. 1. By this arrangement, the radiator grille provides the antenna for the radio receiving set and as it is forward of the automobile and clear of any parts thereof and is also insulated from the remainder of the automobile, it is in a position to obtain maximum signal strength.

Also, by insulating the grille from the remainder of the automobile and spacing it therefrom, there is no opportunity for water to ground the antenna to other parts of the car. By using a grille having a multiplicity of ribs or bars 4, sufficient capacity is obtained to operate as an antenna for the radio and, at the same time, the appearance of the automobile is not damaged. As the grille is substantially vertical and the ribs 5 are also substantially vertical, the antenna is non-directional and as the metal of the grille is of high electrical conductivity, maximum signal strength may be obtained from substantially any direction.

By mounting the grille forward of the automobile radiator, the radiator itself acts as a grounded shield of large capacity between the grille antenna and the ignition system of the automobile. Also the automobile hood combined with the radiator and radiator shell completely shields the automobile ignition system from the grille antenna by these grounded metal members. Consequently, with the grille mounted forward of the radiator and radiator shell and insulated therefrom the grille antenna will pick up a minimum of electrical disturbances from the automobile ignition system. By combining this grille antenna with a shielded lead-in wire, the grille antenna is thus shielded from the ignition system of the automobile in a manner to give maximum results without disturbances from the automobile ignition system. Also the radiator and shell act as a counterpoise for the grille antenna and thus increase the effectiveness of applicant's grille antenna.

From the foregoing description it becomes evident that the device is very simple and efficient in operation, will not easily get out of order, may be easily and quickly installed, will not change the appearance of the automobile and provides a device which accomplishes the objects described.

Having thus fully described my invention, its utility and mode of operation, what I claim and desire to secure by Letters Patent of the United States is—

In a radio antenna for an automobile having a radio receiving set and a radiator shell provided with an inturned peripheral flange, a grille of electrically conductive metal provided with a rim portion and a central rib portion extending across and formed integrally with the rim portion, a series of grille bars extending across the rim portion in substantially the same direction as the central rib and formed integrally with the rim portion, a series of studs extending from the rim portion of the grille, the inturned flange of the radiator shell being apertured to receive the studs, insulators mounted on the studs arranged to insulate the grille from said inturned flange and spacing the grille from the radiator shell, a series of nuts threaded onto the studs, insulating washers fitting over the studs between the nuts and said inturned flange whereby turning up of the nuts will secure the grille to the flange and a shielded insulated lead in wire electrically connected to the central rib of the grille and to the in-put of the automobile radio receiving set.

EUGENE I. WIGGINS.